United States Patent [19]

Reinhall

[11] 4,379,385
[45] Apr. 12, 1983

[54] COMPACTION APPARATUS FOR USE WITH LAWN GROOMING EQUIPMENT

[76] Inventor: Ulf Reinhall, 834 171st Pl., NE., Bellevue, Wash. 98008

[21] Appl. No.: 265,645

[22] Filed: May 20, 1981

[30] Foreign Application Priority Data

Oct. 6, 1980 [SE] Sweden .............................. 8006979

[51] Int. Cl.³ ........................................... A01D 35/22
[52] U.S. Cl. ..................................... 56/16.6; 56/16.9; 56/202; 56/320.2
[58] Field of Search ...................... 56/202, 13.3, 13.4, 56/320.1, 320.2, 16.9, 16.4, 16.6

[56] References Cited

U.S. PATENT DOCUMENTS

| | | | |
|---|---|---|---|
| 3,222,853 | 12/1965 | Michael | 56/202 |
| 3,229,320 | 1/1966 | Cymara | 56/202 |
| 3,664,097 | 5/1972 | Pedigo | 56/13.3 |
| 3,995,414 | 12/1976 | Kerr et al. | 56/202 |
| 4,095,398 | 6/1978 | Aumann et al. | 56/202 |
| 4,121,967 | 10/1978 | Reinhall | 162/246 |

FOREIGN PATENT DOCUMENTS 1582399 7/1970 Fed. Rep. of Germany ........ 56/202

*Primary Examiner*—Jay N. Eskovitz
*Attorney, Agent, or Firm*—Eric Y. Munson

[57] ABSTRACT

A compaction apparatus for use with lawn grooming equipment such as a lawn mower, leaf blower and the like, including a compactor housing having an inlet opening at one end to receive the refuse material picked up from the lawn and a screw conveyor rotatably mounted within the housing to transport and compact the received material as it is advanced through the conveyor housing. Perforations in the housing provide outlets for evacuating from the housing, air and moisture separated from the compressed material as it is initially compacted in the housing. A flexible tubular collector casing or hose is extensibly connected to the outlet end of the compactor housing, into which the initially compacted material is continuously advanced. The cuttings and other refuse material are further compacted against the interior wall of the casing by the force of the continuously advancing material and form a plug in the end of the hose-like casing, causing it to extend from the outlet end of the compactor housing like a sausage. This sausage of compacted refuse material crawls in serpentine fashion along a guided path on the top of the main body of the grooming equipment. When the casing, filled up with backed-up refuse material, has been extended or unfolded, the resultant sausage is severed from the compactor housing and may be dropped on the lawn for subsequent removal to composting dump or other collection site.

The screw conveyor may be provided with a bore for transporting a composting fluid from the inlet end of the conveyor to be discharged into the housing towards its outlet end.

12 Claims, 4 Drawing Figures

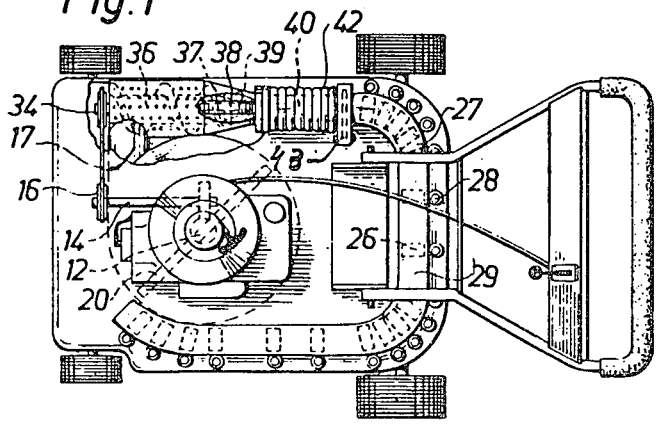
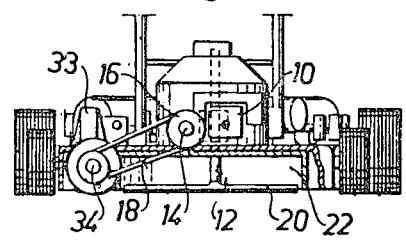
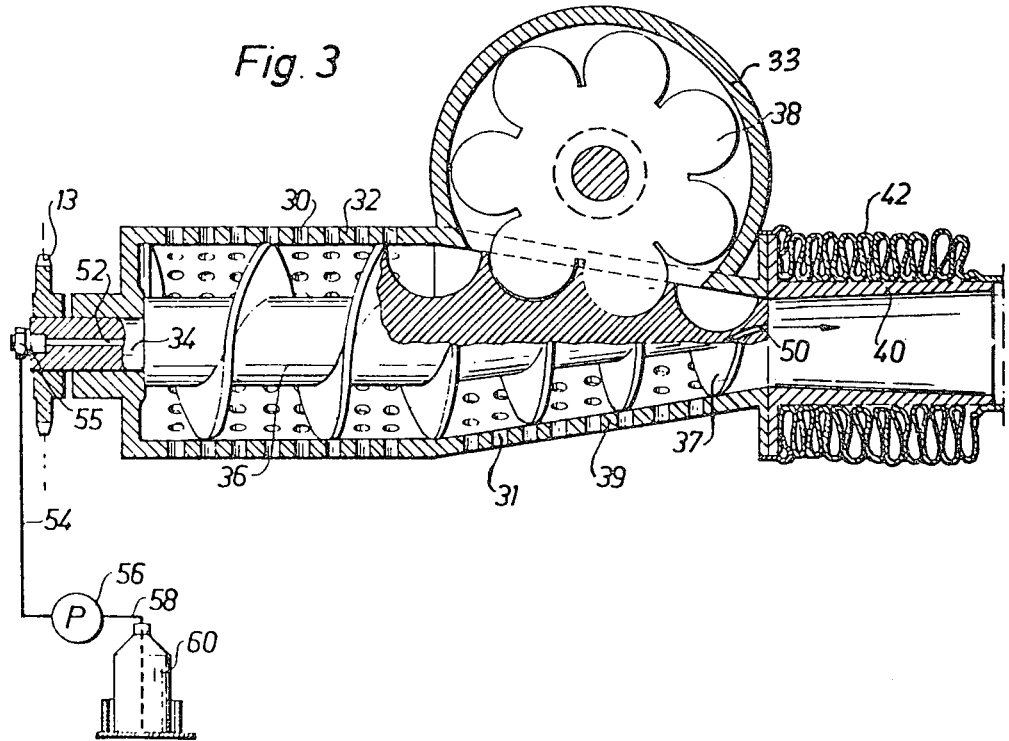

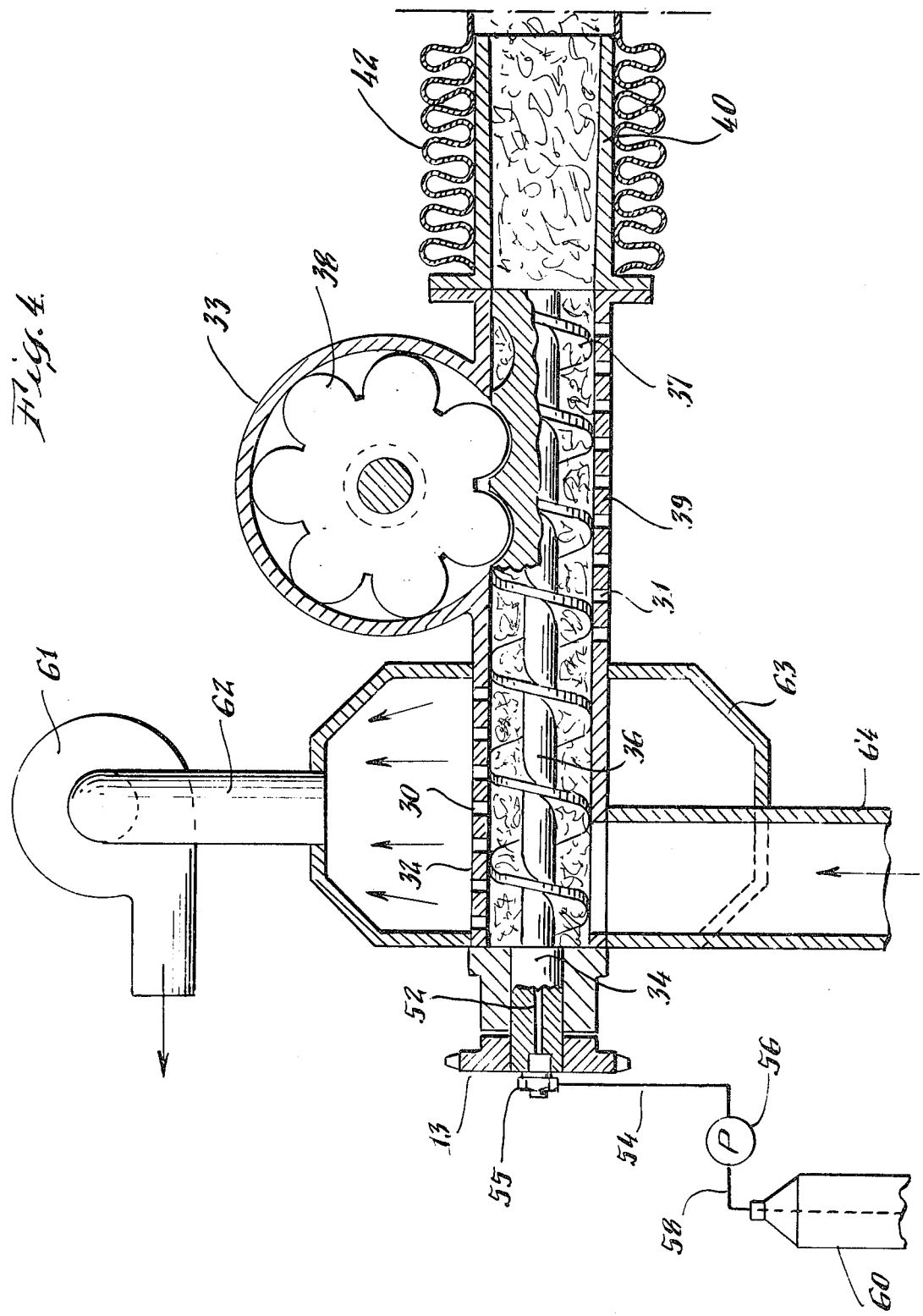

COMPACTION APPARATUS FOR USE WITH LAWN GROOMING EQUIPMENT

BACKGROUND OF THE INVENTION

A. Field of the Invention

The present invention relates to a compacting apparatus for use in conjunction with lawn grooming equipment such as a lawn mower, leaf blower and the like, for collecting and compacting grass cuttings, leaves, twigs and the like. In a further aspect of the invention, means are provided to supply a chemical agent through the compactor to react with the compacted material therein to form compost.

In connection with conventional lawn grooming equipment, the cuttings, leaves, twigs and other refuse material picked up by the machine are either blown back on the lawn or collected in special collection equipment for subsequent manual removal or removal by special collecting apparatus.

The picked-up material is quite voluminous, usually about 10 Kg/m³–20 Kg/m³ per volume of dry weight, and, consequently, collection equipment must be correspondingly voluminous, and the grooming operation must be interrupted frequently for removal of the collected refuse material.

The present invention contemplates an apparatus which provides for continuous compaction of the refuse material during the uninterrupted operation of the lawn grooming equipment, which may be designed to compact the material to a weight volume which may be five times to ten times its non-compacted condition, and even greater.

The apparatus according to the invention also provides for continuous collection and packaging of the refuse material for easy removal to a common collecting site.

The invention also provides for injection of a composting fluid into refuse material during the compacting operation.

B. Discussion of the Prior Art

Compaction apparatus for use with lawn grooming equipment, such as lawn mowers, are known generally to the art. Such compactors, which can be positioned together with the working components of the lawn mower, or which can be separate units attachable to the lawn mower, and similar lawn grooming equipment, are illustrated by U.S. Pat. Nos. 4,103,477; 4,069,649; 3,791,118; 3,736,736; 3,644,097; 3,242,658; 3,222,853; and 2,910,818.

The compactors disclosed by the aforementioned patents generally include a compactor housing having an inlet opening and means for propelling grass cuttings, usually by the centrifugal forces generated by the rotating cutting blades of the lawn mower, through the inlet opening and into the housing. Conveyor means are provided within the housing to convey the grass cuttings therein, and various means are provided to compact the cuttings within the housing. A more detailed discussion of each of the background patents noted above is provided in a document entitled "Disclosure Statement," filed concurrently herewith.

None of the aforementioned patents is believed to disclose a compactor of the general type discussed herein, which includes the feature of a compaction housing to provide an initial compacting step during which moisture and air pressed out from, or accompanying, the material are evacuated through holes in the compactor housing in combination with a tubular casing or hose of flexible material connected extensibly to the outlet opening and into which the initially compacted material is continuously and forcibly advanced by the conveyor means, separated and further compacted therein against the resilient wall of the casing to form a plug in the open end thereof, causing the resultant sausage of compacted material to crawl in serpentine fashion along a guided path on the cover of the lawn grooming equipment. Furthermore, none of the aforementioned background patents discloses a compactor for grass cuttings and other refuse material including means for injecting a chemical composting agent into the refuse material during the compacting operation.

It is an object of the present invention to provide a compaction apparatus for use with a lawn mower, lawn vacuum cleaner and similar lawn grooming equipment incorporating the abovementioned features.

SUMMARY OF THE INVENTION

The compaction apparatus according to the invention includes a compaction housing having an inlet opening at one end thereof for receiving the material to be compacted, and an outlet opening at the opposite end of the housing. The housing is generally cylindrically shaped, but may suitably be tapered in a direction from its inlet end to its outlet end. Conveyor means, such as a conveyor screw, is rotatably mounted within the housing for conveying the picked-up material from the inlet to the outlet end thereof, which housing is provided with openings in its sidewall for evacuating moisture and accompanying air pressed out from the collected material. A flexible tubular casing or hose is extensibly connected to the outlet end of the housing for receiving the initially compacted refuse. As the plug of compacted material is forced through the outlet opening of the conveyor housing, it expands within the hose-like casing and is further compacted against the resilient interior wall thereof to form a plug in the open end, which, under the force of the continuously advancing refuse material, results in the formation of a sausage-like structure which is caused to crawl in serpentine fashion along a guided path on the cover of the lawn grooming equipment.

In a further aspect of the invention, a fluid flow passageway is provided within the conveyor means for supplying a chemical agent to react with the cuttings being compacted in the compaction housing and the compaction chamber to form compost.

For the purpose of simplification, the following descriptions of two embodiments of the invention are given with reference to a lawn mower and a lawn vacuum cleaner, respectively, but it should be understood that the invention is not restricted thereto.

BRIEF DESCRIPTION OF THE DRAWINGS

FIG. 1 illustrates a top plan view of a lawn mower, with its cover partly in section, showing a compaction apparatus in accordance with an embodiment for use with a lawn mower of the invention.

FIG. 2 is a front elevational view of the body portion of the lawn mower of FIG. 1.

FIG. 3 is a side elevational sectional view of the embodiment shown in FIG. 1.

FIG. 4 is a side elevational sectional view similar to FIG. 3, showing the invention applied to a lawn vacuum cleaner.

DETAILED DISCUSSION OF THE DRAWINGS

The lawn mower shown in FIGS. 1 and 2 is provided with conventional wheels, handles and main body, which need not be specifically described herein. Conventional driving means 10, as, for example, a motor, is coupled to a rotatable shaft 12, which supports a rotatable cutting blade 20 surrounded by a cylindrical housing 22. A discharge duct 17 is mounted tangentially to the housing 22, so that the refuse material will be flung into the duct 17 by the effect of the centrifugal force generated by the rotating blade 20.

The duct 17 merges with the cylindrical housing 32 within which screw conveyor 36 is mounted to rotate by means of journal shaft 34 supporting sprocket wheel 13, which is rotated by sprocket wheel 16 via endless chain 18. Sprocket wheel 16 is mounted on shaft 14, which in turn, is driven via a worm gear or similar conventional coupling (not shown) by the motor-driven shaft 12.

Thus, when the driving means 10 is actuated to rotate the cutting blade 20, the rotation of shaft 12 also causes the screw conveyor to rotate as a result of the above-discussed coupling arrangement. In this manner, whenever the lawn mower is being operated, the screw conveyor will automatically rotate within the compacting housing. It should be understood that the present invention is not intended to be restricted to the above coupling arrangement, but that any known arrangement which, when engaged, will simultaneously rotate the cutting blades and the conveyor means, can be used effectively in the invention.

As will be seen from FIG. 3, the conveyor screw 36 comprises a conically tapered portion 37 surrounded by correspondingly tapered housing portion 39 which merges with housing portion 32. This tapered portion 37 of the conveyor screw and the correspondingly tapered housing portion 39 form an initial compacting chamber. Both housing portions 32, 39 are provided with perforations 30 and 31, respectively, for evacuation of accompanying air and moisture pressed out from the refuse material during its advancement through the housing portion.

A relatively thin disc or sprocket wheel 38 extends into a slot in the compacting portion 39 of the housing and is mounted to rotate within the housing 33 bulging from the portion 39. The teeth or sprockets are contoured to fit in the grooves between the screw flights when they are in full meshing engagement therewith. This arrangement is similar to that shown in U.S. Pat. No. 4,121,967 and serves to prevent rotation of the refuse material as it is being advanced under compressive force through the tapered portion 39. The initial compacting chamber comprising the screw conveyor portion 37 and the tapered housing portion 39 is suitably calibrated to progressively compress the refuse advanced therein by the screw conveyor portion 36, so that its volume upon exit from the compacting chamber will be on the order of one-fifth to one-tenth of its original volume, preferably one-eighth of the volume.

The refuse material propelled into the housing 32 by the centrifugal force generated by the rotating blade impinges against the inner wall of the housing and is retained therein, while propellant air generated by the fan effect of the blades 20 is evacuated through the perforations 30, thus permitting continuous flow of refuse material into the housing portion 32 and advancement thereof by the screw conveyor portion 36 into tapered housing portion 39. Under the compression exerted on the refuse material by the screw portion 37 rotating in the housing portion 39, accompanying moisture and residual air are evacuated through perforations 31.

A hollow stud 40 is connected to the outlet end of the tapered portion 37 which preferably has a progressively increasing diameter in the direction of flow. The stud 40 has a length about two times to three times the inlet diameter, which is equal to that of the outlet end of the tapered portion 39. A flexible hose-like casing 42, composed of paper, plastic material, textile fabric or similar resilient material, is treaded loosely or folded over the stud 40 in accordian pleat fashion and fastened about the flanges thereof and the flange of the tapered outlet end of housing portion 39. As the hose-like casing fills up with compacted refuse material from the stud 40, it forms a length of a sausage 29 which extends along a track 27 defined by horizontal conveyor rollers 26 and vertical guide rollers 28, as shown schematically in FIG. 1.

During the advancement of the refuse material by the tapered screw portion 37, the latter is compressed in proportion to its gradually decreasing thread dimension and with regard to the amount of refuse material advanced by the screw portion 36. The thus compacted refuse material is discharged into the stud 40, where it expands against the flared walls, and the friction creates a resisting moment which causes further compression of the material during the continuous transition from the rotating screw portion 37 to the stud 40. The auxiliary compression compensates for and equalizes possible variation in the amount of refuse material. However, by exchanging the sprocket wheel 13, for example, the number of revolutions of the screw conveyor 36, 37 can be adjusted according to the type and volume per unit of weight of the refuse material.

As mentioned herein, moisture accompanying wet refuse material is pressed out through the perforations 31 by the compressing force exerted thereon by the screw portion 37. This withdrawal of moisture contributes to the reduction of weight of the compacted material and facilitates the subsequent handling thereof. The evacuation of moisture is also of importance when the compacted refuse material is to be treated with a compost fluid or chemical solution, as will be described herein.

As will be observed from FIG. 3, a channel 52 passes through the shaft of the screw portions 36, 37, which terminates in an opening 50 at the outlet end of the tapered screw portion 37. Compost fluid is pumped into channel 52 by a pump 56 via ducts 54 and 58 and rotating coupling 55 from a reservoir 60, which may be located on a suitable place on the lawn grooming equipment. In view of the dewatered condition of the refuse material in the screw portion 37, the chemical solution injected through the opening 50 will not unnecessarily be diluted, and, consequently, lesser amounts thereof will suffice.

The thus compacted and treated refuse material forms a plug in the stud 40. As the plug is fed out from the stud 40 into the casing 42, it expands therein and will remain compacted against the interior wall thereof, thus plugging the open end of the casing. The plugging of the open end results in the formation of a sausage of refuse material which, under the propellant force of the continuous advancement of material into the casing, is caused to travel or crawl in serpentine fashion along the track 27. When the desired length of sausage is attained, it may be severed, for example, at a distance of 100 mm. from the stud nozzle by means of cutting device 43, as shown in FIG. 1. The amount of refuse material confined within the casing 42 is substantially the equivalent of ten times the volume of non-compacted material. It has been shown that, with a stud 40 and a casing 42 having a diameter on the order of 100 mm. and a casing length of 2 m., the amount of refuse material compacted in the casing is the equivalent of about 100 liters to 150 liters of non-compacted refuse, which, in normal use of a lawn mower, should eliminate the necessity for removing the casing during the lawn-mowing operation. The severed sausages of refuse material can easily be made to conform to available collection vessels, or they can be layered to form compost heaps without creating the usual unsanitary conditions. After completion of the composting process, the compost sausages can be severed to desired lengths according to need.

In the embodiment shown in FIG. 4, collection of the refuse material is assisted by or entirely achieved by a suction fan 61 connected via duct 62 to a plenum chamber 63 surrounding the conveyor housing 32. The refuse material is sucked up into the housing 32 by the fan 61 via the vacuum duct 64.

The descriptions of the described embodiments are intended for the purpose of illustration only, and the invention is subject to a variety of expressions within the scope of the appended claims.

Thus, the conveyor screw 36 may extend for its entire length through the conveyor housing without taper, as shown in FIG. 4, whereby the compression takes place as the material is being forced by the screw 36 towards the outer end of the stud 40, whose diameter may then progressively decrease to a lesser degree.

I claim:

1. In lawn grooming equipment in which lawn grooming means are mounted within a main body adapted to be moved over the surface to be groomed, which grooming means are driven to generate a flow of refuse material picked up from the lawn into a compacting device connected to said main body, said compacting device comprising a conveyor which rotates within a housing to convey the refuse material from a material inlet end to a material outlet end therein, the improvement comprising:
   (a) a conveyor housing surrounding a solid type compacting screw conveyor rotating therein to convey the refuse material while compressing it progressively therein as it is advanced through said housing from said material inlet to said material outlet end;
   (b) perforations in the wall of said conveyor housing for evacuating accompanying air and moisture from the refuse material during the compression step; and
   (c) a tubular casing extensibly connected to the outlet opening of said conveyor housing for receiving the initially compacted refuse material and allowing it to expand against the tubular wall thereof to plug one end thereof and thus cause the casing and the enclosed compacted refuse material to advance like a sausage from said outlet end under the force of the continuous advancement of refuse material from said conveyor housing.

2. Lawn grooming equipment according to claim 1, further comprising means for guiding a length of said sausage along a track on the main body of the lawn grooming equipment.

3. Lawn grooming equipment according to claim 1, in which said conveyor housing and said compacting screw conveyor are tapered so as to compress the refuse material in a ratio between 1:5 and 1:10.

4. Lawn grooming equipment according to claim 1, in which the inlet portion of the compacting housing is connected to a suction device to create an air stream whereby refuse material is drawn from the lawn in to the compacting conveyor.

5. Lawn grooming equipment according to claim 1, in which said conveyor housing and said screw conveyor are cylindrical and extend from the material inlet end to the material outlet end.

6. Lawn grooming equipment according to claim 1, in which said conveyor housing and said compacting screw conveyor comprise a cylindrical portion at the inlet end merging with a conical portion tapering towards the outlet end.

7. Lawn grooming equipment according to claim 1, further comprising a sprocket wheel having teeth contoured to conform to the flights of said compacting conveyor screw mounted in a slot defined in the wall of said conveyor housing to rotatably engage said screw flights to thereby prevent the refuse material from turning with the conveyor screw during the advancement and compression thereof.

8. Lawn grooming equipment according to claim 1, comprising a stud connected to said material outlet for further compression of collected refuse and for supporting said tubular casing.

9. Lawn grooming equipment according to claim 8, in which said stud has an outwardly flaring bore.

10. Lawn grooming equipment according to claim 1, further comprising a bore defined in said conveyor housing and in said compacting conveyor screw for transporting a fluid into a region proximate to the outlet end of the conveyor housing.

11. Lawn grooming equipment according to claim 9, wherein said fluid comprises a chemical substance adapted to react with the refuse material to form compost.

12. Lawn grooming equipment according to claim 10, further comprising means for supplying said fluid to said bore.

* * * * *